3,084,124
PROCESSES FOR BREAKING PETROLEUM EMULSIONS OF THE OIL-IN-WATER TYPE
Willard H. Kirkpatrick, Sugar Land, and Virgil L. Seale, Houston, Tex., assignors to Nalco Chemical Company, a corporation of Delaware
No Drawing. Filed June 15, 1959, Ser. No. 820,109
5 Claims. (Cl. 252—332)

This invention, in general, relates to processes for the resolving and treatment of emulsions of mineral oils and water, such as petroleum emulsions commonly encountered in the production, handling and refining of crude mineral oil.

The present application is a continuation-in-part of our copending application Serial No. 692,573, filed October 28, 1957, now abandoned, which is a division of our copending application Serial No. 632,433, filed January 4, 1957.

Petroleum emulsions are, in general, of the water-in-oil type wherein oil acts as the continuous phase for dispersal of the finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries.

One type of process involves subjecting emulsions of the water-in-oil type to the action of a deemulsifying agent of the kind hereinafter described, thereby causing the emulsion to resolve and stratify into its component parts of oil and water or brine after emulsion has been allowed to stand in a relatively quiescent state.

One object of our invention is to provide novel and economical effective processes for resolving emulsions of the character referred to into their component parts of oil and water or brine.

Another object is to provide processes utilizing novel reagents which are surface-active in order to enable their use as demulsifiers or for such uses where surface-active characteristics are necessary or desirable. Other objects will appear hereinafter.

In accordance with the invention, the crude oil demulsifying agents are the sulfation products of oxyalkylated alkyl phenol-formaldehyde resins. The phenol-formaldehyde resins are the alkali-insoluble reaction products of formaldehyde with a difunctional, monoalkyl phenol, the alkyl group having between 4–15 carbons, inclusive, preferably 5–15 carbons. Dialkyl, mono-functional phenols are not suitable for compositions of this invention, but amounts up to 25% dialkyl phenol in the monoalkyl phenol reactant may be tolerated. The weight ratio of the oxyalkylene groups, e.g., oxyethylene or both oxyethylene and oxypropylene groups, to the phenol-formaldehyde condensation product will, for most applications, fall between about 1:2 and 15:1, respectively, preferably the range of 1:2 to 9:1. Where mixtures of ethylene oxide and 1,2-propylene oxide are used to oxyalkylate the phenol-formaldehyde condensation product they may be reacted as a mixture or the oxides be added sequentially—one oxide being added to the resin first and the other oxide being added to the oxyalkylene groups. Ordinarily, we prefer to oxyalkylate with propylene oxide first.

In this manner the terminal oxyalkylation groups are those of oxyethylene, which have primary hydroxyl groups. Oxypropylene groups, on the other hand, have terminal secondary hydroxyl groups, which are more difficult to sulfate. Simultaneous reaction of a mixture of the oxides probably gives an oxyalkylated product having both types of terminal hydroxyl groups. When the ethylene oxide and propylene oxide are mixed prior to oxyalkylation, the preferred weight ratio of the two oxides is in the range of 1:4 to 4:1. When these oxides are reacted in sequential fashion, the weight ratio of oxyethylene to oxypropylene groups is about 4:1 to 1:25, respectively.

PHENOL-FORMALDEHYDE CONDENSATION

The phenol-formaldehyde condensation products are prepared by reacting formaldehyde or a substance which breaks down to formaldehyde under the reaction conditions, e.g., para-formaldehyde and trioxane, and a difunctional, monoalkyl phenol, by heating the reactants in the presence of a small amount of an acid catalyst such as sulfamic acid under substantially anhydrous conditions—excepting the water produced during the reaction. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol-formaldehyde condensation product in a hydrocarbon solvent. The molecular weight of these intermediate condensation products cannot be ascertained with certainty, but we would approximate that the resins employed herein should contain about 4 to 15, preferably 4 to 10, phenolic nuclei per resin molecule. The solubility of the condensation product in hydrocarbon solvent would indicate that the resin is a linear type polymer, thus distinguishing them from the more common phenol-formaldehyde resins of the cross-linked type.

The alkyl phenols should have the alkyl group in the ortho- or para-position so that the phenolic reactant has difunctionality. The alkyl group must have at least 4, preferably at least 5, carbon atoms with about 15 carbon atoms being the maximum. Such phenols include p-tertiary butyl phenol, p-amyl phenol, p-tertiary hexyl phenol, p-n-hexyl phenol, p-octyl phenol, p-nonyl phenol, p-dodecyl phenol, mixtures thereof, and mixtures of such monoalkyl phenols with not more than 25% by weight of monofunctional, dialkyl phenols such as a commercial grade crude alkylate phenol consisting of about 90% p-nonyl phenol and 10% dinonyl phenol.

This aspect of the invention is illustrated in the following examples but is not limited thereto. The parts are by weight.

*Example A*

In a three-necked reaction flask provided with means of mechanical stirring and a return condenser system permitting the removal of any aqueous phase formed in the course of reaction, there is added 1500 parts of a crude alkylate phenol which comprises about 90% p-nonyl phenol and approximately 10% of dinonylphenol, 225 parts paraformaldehyde and 3 parts sulfamic acid which is present as a catalyst in the reaction. The reaction mass is heated, and at 108° C. an aqueous distillate begins to form. After three hours heating at approximately 110° C. the mass becomes quite viscous and is permitted to cool to about 100° C. At this point, 600 parts of a suitable hydrocarbon fraction such as $SO_2$ extract is added, and heating is resumed. Again at 100°

C. further aqueous distillate begins to form, and heating is continued for an additional three hours to a maximum temperature of 212° C. The product is permitted to cool to yield the finished phenol-formaldehyde resin in the hydrocarbon solvent.

*Example B*

In a manner similar to Example A, 1000 parts of the crude alkylate phenol, 120 parts of paraformaldehyde and 2 parts sulfamic acid were heated 2 hours at 105–110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of a suitable hydrocarbon fraction such as $SO_2$ extract is added. Heating is continued for an additional three hours, or until a total of about 75 parts of aqueous distillate have been removed at maximum temperature of 212° C. to yield the finished phenol-formaldehyde resin in the hydrocarbon solvent.

*Example C*

In a manner similar to Examples A and B, 1000 parts of the crude alkylate phenol, 90 parts paraformaldehyde and 2 parts sulfamic acid are carefully reacted at temperatures of 100–110° C. When the reaction mass becomes quite viscous, it is permitted to cool, and 400 parts of $SO_2$ extract are added. Heating is resumed for an additional hour, or until a total of 55 parts of aqueous distillate have been secured at maximum temperature of 210° C. to yield the finished phenol-formaldehyde resin in the hydrocarbon solvent.

*Example D*

In a manner similar to Example A, 1200 parts of p-tertiary butyl phenol, 275 parts of paraformaldehyde and 3 parts of sulfamic acid are heated slowly. An aqueous distillate begins to form at about 105–110° C. After 3 hours of heating at 105–110° C. with the removal of the aqueous distillate, the reaction mass is cooled to about 100° C. Then 600 parts of $SO_2$ extract is mixed with the reaction mass, and heating is resumed. At about 100° C., further aqueous distillate comes off and heating is continued for an additional three hours to a maximum final temperature of 205–210° C. The mass is then cooled to room temperature.

*Example E*

The procedure of Example D is repeated with the substitution of an equivalent amount of p-hexyl phenol for the p-tertiary butyl phenol.

In the preceding examples, sulfamic acid has been used ase th acid catalyst to assist in the condensation reaction. Other suitable equivalent acids which may be used in place of sulfamic acid are mineral acids such as sulfuric acid, hydrochloric acid, phosphoric acid, etc.

As stated heretofore, intermediate phenol-formaldehyde resin should contain a minimum of about 4 phenolic nuclei and should not exceed about 15 phenolic nuclei. It is extremely difficult, if not impossible, to accurately determine the molecular weight of the intermediate resin products. However, it is believed that the resin of Example A contains about 10 phenolic nuclei per resin molecule Example B, about 7 phenolic nuclei, and Example C, about 4 phenolic nuclei per resin molecule.

OXYALKYLATION OF THE CONDENSATION PRODUCTS

Having prepared the intermediate phenol-formaldehyde products, the next step is the oxyalkylation of the condensation products with the alkylene oxides having 2–3 carbons. This is achieved by mixing the intermediate phenol-formaldehyde condensation product in a hydrocarbon solvent with a small amount of a suitable catalyst in an autoclave. The condensation product is heated above 100° C., and ethylene oxide or a mixture of ethylene oxide and propylene oxide, either as a mixture of by sequential addition of first either the propylene oxide or the ethylene oxide and later the other oxide, is charged into the autoclave until the pressure is in the vicinity of 75–100 p.s.i.

The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product is between about 1:2 and 15:1, respectively, preferably 1:2 to 9:1. The molecular weight of the oxyalkylated phenol-formaldehyde condensation products of this invention range from as low as about 1100 to as high as about 50,000.

Some preferred embodiments of the oxyalkylated, alkyl phenol-formaldehyde condensation products and methods of their preparation are illustrated in the following examples wherein all parts are by weight unless otherwise stated, but the invention is not limited thereto.

*Example F*

In an autoclave having a two-liter capacity equipped with a means of external electric heating, internal cooling coils and mechanical agitation, there is charged 950 parts of the resin solution of Example A, and 1.5 parts of sodium hydroxide. Into a transfer bomb there is introduced 575 parts ethylene oxide. The resin is heated to 135° C., and the ethylene oxide is charged into the reactor until reactor pressure is 80 p.s.i. The reaction mixture is gradually heated until an exothermic reaction begins to take place. The external heating is then removed and ethylene oxide is then added at such a rate that the temperature is maintained between 150–160° C. with a pressure range of 80 to 100 p.s.i. After approximately two hours all of the oxide has been added to the autoclave, and the temperature is maintained for an additional 15 minutes to make certain that the unreacted oxide is reduced to a minimum. The resulting product is the ethylene oxide adduct of a phenol-formaldehyde resin, in which the weight ratio of oxide to resin by weight is 2 to 3. The oxyalkylated phenol-formaldehyde condensation product had a hydroxyl equivalent weight of about 620 and contained about ten oxyalkylene chains per resin molecule.

*Example G*

In a manner similar to Example F, the ethylene oxide adduct of the resin of Example B was prepared in which the ratio of ethylene oxide to resin was 1½ to 1 by weight. The oxyalkylated phenol-formaldehyde condensation product had a hydroxyl equivalent weight of about 840 and contained about four oxyalkylene chains per resin molecule.

*Example H*

In the same facilities as used in Example F, there is charged 172 parts of the resin solution of Example A and 1 part of sodium hydroxide. Into a transfer bomb there is introduced 250 parts by weight of ethylene oxide and 250 parts of propylene oxide. The intermediate is heated to 135° C., and the mixed oxides are charged into the reactor until the reactor pressure is 80 p.s.i. The reaction conditions from here on are identical with those employed in Example D. The resulting product is the mixed oxide adduct of a phenol-formaldehyde resin in which the ratio of oxide to resin by weight is approximately 4 to 1. The oxyalkylated phenol-formaldehyde condensation product had a hydroxyl equivalent weight of about 1400 and contained about ten oxyalkylene chains per resin molecule.

*Example J*

In a manner similar to Example H, using a 1 to 1 by weight ratio of ethylene oxide and propylene oxide, a mixed oxide adduct of the resin of Example C was prepared in which the ratio of oxide to resin was 6 to 1. The oxyalkylated phenol-formaldehyde condensation product had a hydroxyl equivalent weight of about 1400 and contained about four oxyalkylene chains per resin molecule.

*Example K*

In a manner similar to Example H using a 1 to 3 by weight ratio of ethylene oxide to propylene oxide, a mixed oxide adduct of the resin of Example C was prepared in which the ratio of oxide to resin was 6 to 1. The oxyalkylated phenol-formaldehyde condensation product had a hydroxyl equivalent weight of about 1500 and contained about four oxyalkylene chains per resin molecule.

*Example L*

In a manner similar to Example H using a 1 to 3 by weight ratio of ethylene oxide to propylene oxide, a mixed oxide adduct of the resin of Example B was prepared in which the ratio of oxide to resin was 2 to 1.

*Example M*

In a manner similar to Example H using a 3 to 1 by weight ratio of ethylene oxide to propylene oxide, a mixed oxide adduct of the resin of Example A was prepared in which the ratio of oxide to resin was 1 to 1. The oxyalkylated phenol-formaldehyde condensation product had a hydroxyl equivalent weight of about 700 and contained about ten oxyalkylene chains per resin molecule.

*Example N*

In a manner similar to Example F there is prepared a propylene oxide adduct of the resin of Example A in which the ratio of propylene oxide to resin by weight is 1 to 1. The oxypropylated phenol-formaldehyde resin was then reacted further with ethylene oxide until the finished product contained 10% by weight of ethylene oxide. The oxyalkylated phenol-formaldehyde condensation product had a hydroxyl equivalent weight of about 750 and contained about ten oxyalkylene chains per resin molecule.

*Example O*

In a manner similar to Example N a propylene oxide adduct of the resin of Example C was prepared in which the ratio of propylene oxide to resin was 6 to 1 by weight. Ethylene oxide was then added to this oxypropylated phenol-formaldehyde resin until the finished product contained 20% by weight of ethylene oxide. The oxyalkylated phenol-formaldehyde condensation product had a hydroxyl equivalent weight of about 1200 and contained about four oxyalkylene chains per resin molecule.

*Example P*

In a manner similar to Example N a propylene oxide adduct of the resin of Example A was prepared in which the ratio of propylene oxide to resin was 9 to 1 by weight. This oxypropylated phenol-formaldehyde resin was then further reacted with ethylene oxide until the finished material contained 5% by weight of ethylene oxide. The oxyalkylated phenol-formaldehyde condensation product had a hydroxyl equivalent weight of about 1400 and contained about ten oxyalkylene chains per resin molecule.

*Example Q*

In a manner similar to Example N a propylene oxide adduct of the resin of Example C was prepared in which the ratio of propylene oxide to resin was 2 to 1 by weight. This oxypropylated phenol-formaldehyde resin was then further reacted with ethylene oxide until the finished material contained 30% by weight of ethylene oxide. The oxyalkylated phenol-formaldehyde condensation product had a hydroxyl equivalent weight of about 1200 and contained about four oxyalkylene chains per resin molecule.

*Example R*

Into the gas charge vessel of an oxyalkylation unit is charged 250 parts of ethylene oxide and 250 parts of propylene oxide. The gases are circulated via a circulating pump to mix them thoroughly. Then 2,000 parts of the phenol-formaldehyde resin solution of Example D and 3.8 parts of sodium hydroxide are charged into the oxyalkylation. The reactor is purged with natural gas. The mixed oxides are added at 150–160° C. The oxyalkylation is completed at this temperature and a pressure of 80–100 p.s.i. The gases are recycled in the unit for two hours after the addition of oxides is complete. The resulting product is oxyalkylation product of the phenol-formaldehyde resin wherein the oxyethylene and oxypropylene groups are mixed heterogeneously in the oxyalkylene adduct radicals.

*Example S*

In a manner similar to Example R, 7200 parts of the resin solution of Example D and 1800 parts of an ethylene oxide-propylene oxide mixture (2 parts by weight of propylene oxide per part ethylene oxide) are reacted in the presence of 13 parts of sodium hydroxide.

*Example T*

The mixed oxyethylene and oxypropylene adduct of the phenol-formaldehyde resin of Example E is prepared by substituting the resin solution of Example E for the resin solution of Example D in the procedure of Example S.

SULFATION OF THE OXYALKYLATED
CONDENSATION PRODUCTS

The next and final step in the preparation of the compositions of our invention is the sulfation of the oxyalkylated alkyl phenol-formaldehyde condensation products. The degree of sulfation may range from compositions in which only one hydroxyl group per oxyalkylated phenol-formaldehyde resin molecule is sulfated to total sulfation of the hydroxyl groups of the oxyalkylated resin. The preferred sulfating reagent is sulfamic acid because of the ease and convenience in handling in plant operations. The sulfo groups, however, can be introduced by other means such as sulfuric acid, sulfur trioxide, etc. With the use of these latter reagents it is essential that the temperature conditions of reaction be lower and be carefully controlled so that the sulfation reaction proceeds without decomposition of the oxalkylated phenol-formaldehyde resin. Other than the careful control of temperature conditions and sulfation at lower temperatures, the reaction conditions employed for the preparation of the sulfo derivatives with the last-mentioned sulfating agents are substantially identical to those for sulfation with sulfamic acid. The sulfation is accomplished by heating and stirring a mixture of the oxyalkylated phenol-formaldehyde resin and the sulfating reagent. The mixture is heated in the vicinity of about 120–150° C. in the case of sulfamic acid and held at that point for approximately two hours under agitation to complete the sulfation reaction. The sulfated product so prepared is then cooled below about 100° C., at which point a suitable hydrocarbon extract is added to yield a solution of the finished product. It has been observed that increasing the number of sulfo groups per molecule results in substantially increased viscosity of the sulfated product.

The sulfated oxyalkylated resin may be used in the acid form or any suitable form wherein the ionizable hydrogen is replaced by a metal or other suitable cation. In many instances, it is desirable that the compositions be in the form of salts of alkali metals or the ammonium salt. These salts may be obtained by reacting the acidic product with a metallic hydroxide, ammonia, or an organic base, or an alkaline salt of one of these. Suitable bases and salts include ammonium, sodium and potassium hydroxides and carbonates, as well as bicarbonates; aqueous ammonia; and amines such as lower alkyl amines, lower alkanol amines, and simple aryl amines. Sulfamic acid as the sulfating reagent yields the ammonium salt.

The following examples will further illustrate the nature of the compositions of this invention in preferred embodiments thereof, but the invention is not limited to these examples.

*Example I*

In a three-necked reaction flask provided with means of mechanical stirring and heating there is added 200 parts by weight of a material as prepared in Example L and 2 parts by weight of sulfamic acid. The mixture is heated to 130° C. and held at that point for two hours to complete the sulfation reaction. The reaction product so prepared is cooled to below 100° C. at which point 175 parts by weight of a suitable hydrocarbon extract such as $SO_2$ extract is added to yield the finished product. This sulfation reaction results in the introduction of approximately one sulfato group per oxyalkylated resin molecule.

*Example II*

In a manner similar to Example I, 200 parts of the oxyalkylated resin of Example F, and 32 parts of sulfamic acid were reacted to yield a completely sulfated oxyalkylated phenol-formaldehyde resin. To this sulfated product there is added 175 parts by weight of a suitable hydrocarbon fraction such as $SO_2$ extract to yield the finished product. This product was prepared in a manner that would be conducive to the sulfation of each free hydroxyl group on the oxyalkylated phenol-formaldehyde resin. It is believed that this particular example has about 10 sulfato groups per resin molecule.

*Example III*

In a manner similar to Example I, 200 parts of the oxyalkylated resin of Example G was reacted with 32 parts by weight of sulfamic acid to yield a partially sulfated oxyalkylated phenol-formaldehyde resin in which approximately one-half of the free hydroxyl groups of the resin were sulfated. To this sulfated product there was added 175 parts by weight of a suitable hydrocarbon fraction such as $SO_2$ extract to yield the finished product. It is believed that there is about two free hydroxyl groups remaining per molecule in this product.

*Example IV*

In a manner similar to Example I, 200 parts by weight of the oxyalkylated resin of Example R is reacted with 10 parts by weight of sulfamic acid at 125–130° C. for two hours. To the cooled reaction product is added 175 parts by weight of $SO_2$ extract.

*Example V*

In a manner similar to Example I, 200 parts by weight of the oxyalkylated resin of Example T is reacted with 8 parts by weight of sulfamic acid at 125–130° C. for two hours. To the cooled reaction product is added 175 parts by weight of $SO_2$ extract.

Among the suitable hydrocarbon vehicles which can be employed as solvents for our sulfated resins is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

DEEMULSIFICATION

The compositions of this invention are surface-active and are particularly suitable for the deemulsification of crude oil emulsions. Deemulsification is achieved by mixing the deemulsifying agents of this invention, at a ratio in the approximate range of one part of the deemulsifying agent to 2,000–50,000 parts of the emulsion, and thereafter allowing the emulsion to remain in a relatively quiescent state during which separation of the oil and water occurs. The deemulsifying agents of this invention may be used in conjunction with other deemulsifying agents from classes such as the petroleum sulfonate type, of which naphthalene sulfonic acid is an example, the modified fatty acid type, the amine modified oxyalkylated phenol-formaldehyde type, and others.

The effectiveness of the compositions of this invention as deemulsifying agents is illustrated in the following tests and data.

BOTTLE TESTING OR CRUDE OIL EMULSIONS

The bottle testing of crude oil emulsions is conducted according to the following procedure: Fresh samples of the emulsion-breaking chemicals in organic solvent solution are prepared in 10% solutions. These solutions are made by accurately diluting 10 milliliters of the emulsion-breaking chemicals in 90 milliliters of a mixture of equal parts of anhydrous isopropyl alcohol and an aromatic hydrocarbon such as xylene. The mixture is agitated well until the emulsion-breaking chemical is completely dissolved.

The equipment for running the crude oil emulsion-breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the thumb over the opening of each bottle so that the bottle will be coated with an emulsion film.

By means of the 0.2 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F. the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause reemulsification. In these instances it is necessary to rethief and add a lesser amount. Each tube is vigorously shaken to make sure that the packed B.S. layer is broken up and the tubes heated to 150° F. in the case of troublesome paraffin base crude oil. The samples are then centrifuged for three minutes.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottle before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion-breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

By way of illustrating the effectiveness of the emulsion-breaking chemicals contemplated by this invention, the composition of Example I was tested according to the foregoing bottle testing procedure on samples of 28 gravity crude oil obtained from Spivey Field, Kansas. The crude oil emulsion contained about 56% water. The commercial treating chemical being used on the lease and the treating chemical of Example I were both tested for comparative purposes. These treating chemicals were added at a ratio of 0.06 part of a 10% solution, as described in the foregoing procedure, to 100 parts of the emulsion fluid. The samples were given 150 shakes cold and 50 shakes hot, the hot temperature being 170° F.

The observations made during the tests were recorded and are summarized in the following table.

TABLE I

| Treating Chemical | Water Drop | | Thief Grind-Out | | Excess Grind-Out | |
|---|---|---|---|---|---|---|
| | 15 min. to 170° F. | 60 min. | B.S. | Water | B.S. | Water |
| Commercial chemical | 14 | 42 | 5.8 | 0.2 | 0 | 5.6 |
| Example I | 28 | 45 | 2.6 | 0.2 | 0 | 2.4 |

Similar tests were made on a crude oil emulsion containing about 64% water of a 25 gravity crude oil from a lease in South Meadow Creek Field, Wyoming. The treating chemicals tested included the commercial de-emulsifying agent being used on the lease in addition to the treating composition of Example I at a ratio of 0.10 part of a 10% solution of the treating chemical to 100 parts of the emulsion fluid. The samples were given 100 cold shakes and 50 hot shakes, the hot temperature being 110° F. A summary of the observations made during the test appears in the following table.

TABLE II

| Treating Chemical | Water Drop | | Thief Grind-Out | | Excess Grind-Out | |
|---|---|---|---|---|---|---|
| | 15 min. | 60 min. | B.S. | Water | B.S. | Water |
| Commercial Chemical | 7 | 15 | 31.0 | 34.0 | 0 | 56.0 |
| Example I | 25 | 62 | 2.4 | 0 | 0 | 1.2 |

The invention is hereby claimed as follows:

1. A process for breaking a petroleum oil emulsion of the water-in-oil type, characterized by subjecting said emulsion to the demulsifying action of an oil-soluble, partially sulfated, oxyalkylated, linear polycondensate of formaldehyde and an alkyl phenol which is at least 75% monoalkyl, difunctional phenol and wherein the alkyl groups have 4–15 carbons, the oxyalkylene groups being selected from the group consisting of oxyethylene and both oxyethylene and oxypropylene at a weight ratio of oxyethylene to oxypropylene groups in the range of 4:1 to 1:25, respectively, with the further proviso that, when said oxyalkylene groups are formed by the oxyalkylation of said polycondensate with a mixture of both ethylene oxide and propylene oxide, the last-mentioned ratio is 4:1 to 1:4, the weight ratio of said oxyalkylene groups to said alkyl phenol-formaldehyde polycondensate being in the range of 1:2 to 15:1, said alkyl phenol-formaldehyde polycondensate containing 4–15 alkyl phenolic nuclei per mol, and the degree of partial sulfation of said oxyalkylated polycondensate ranging from about one sulfato group per mol of oxyalkylated polycondensate up to about 50% sulfation of the total sulfatable hydroxy groups of the oxyalkylated polycondensate, the sulfating agent being sulfamic acid which gives sulfato groups in the form of the ammonium salt.

2. A process as defined in claim 1 wherein the weight ratio of said oxyalkylene groups to said alkyl phenol-formaldehyde polycondensate is in the range of 1:2 to 9:1 and said alkyl groups have 5–15 carbons.

3. A process as defined in claim 1 wherein said oxyalkylene groups are solely oxyethylene groups.

4. A process as defined in claim 1 wherein said oxyalkylene groups are both oxyethylene and oxypropylene groups formed by the oxyalkylation of said polycondensate with a mixture of both ethylene oxide and propylene oxide in a weight ratio within the range of 1:4 to 4:1.

5. A process as defined in claim 1 wherein said oxyalkylene groups are both oxyethylene and oxypropylene in a weight ratio of 4:1 to 1:25, respectively, and said oxypropylene groups are adducted on the alkyl phenol-formaldehyde polycondensate and said oxyethylene groups are adducted on the oxypropylated alkyl phenol-formaldehyde polycondensate.

References Cited in the file of this patent

UNITED STATES PATENTS

| | | |
|---|---|---|
| 2,278,170 | De Groote et al. | Mar. 31, 1942 |
| 2,454,542 | Bock et al. | Nov. 23, 1948 |
| 2,454,543 | Bock et al. | Nov. 23, 1948 |
| 2,539,478 | Roberson | Jan. 30, 1951 |
| 2,557,081 | De Groote et al. | June 19, 1951 |

OTHER REFERENCES

Gregory, Uses and Applications of Chemicals and Related Products, vol. II, page 320, pub. 1944 by Reinhold Pub. Corp. of N.Y.